United States Patent
Brown et al.

(10) Patent No.: US 8,171,288 B2
(45) Date of Patent: May 1, 2012

(54) SYSTEM AND METHOD FOR AUTHENTICATING USERS IN A COMPUTER NETWORK

(75) Inventors: Timothy J. Brown, Tampa, FL (US); Gregory C. Jensen, Redmond, WA (US); Rodney Rivers, Arlington, VA (US); Dan Nelson, Tampa, FL (US)

(73) Assignee: Imprivata, Inc., Lexington, MA (US)

( * ) Notice: Subject to any disclaimer, the term of this patent is extended or adjusted under 35 U.S.C. 154(b) by 1633 days.

(21) Appl. No.: 11/199,432

(22) Filed: Aug. 8, 2005

(65) Prior Publication Data
US 2005/0273866 A1 Dec. 8, 2005

Related U.S. Application Data

(63) Continuation of application No. 10/614,353, filed on Jul. 7, 2003, now Pat. No. 6,928,547, which is a continuation of application No. 09/347,779, filed on Jul. 6, 1999, now Pat. No. 6,618,806.

(60) Provisional application No. 60/091,824, filed on Jul. 6, 1998.

(51) Int. Cl.
*H04L 9/32* (2006.01)
*H04L 29/06* (2006.01)
*G06F 21/00* (2006.01)
*G06F 7/04* (2006.01)
*G06F 12/14* (2006.01)

(52) U.S. Cl. ........ 713/168; 713/166; 713/170; 713/182; 713/186; 726/4; 726/5; 726/6; 726/17; 726/26

(58) Field of Classification Search .............. 726/1, 4–6, 726/17, 26; 713/166, 168, 170, 182, 186
See application file for complete search history.

(56) References Cited

U.S. PATENT DOCUMENTS

| 4,596,898 A | 6/1986 | Pemmaraju ..................... 380/45 |
| 4,827,518 A | 5/1989 | Feustel et al. ................... 381/42 |
| 5,018,096 A | 5/1991 | Aoyama |
| 5,229,764 A | 7/1993 | Matchett et al. ......... 340/825.34 |
| 5,272,754 A | 12/1993 | Boerbert ........................ 380/25 |
| 5,276,444 A | 1/1994 | McNair |
| 5,280,527 A | 1/1994 | Gullman et al. ................ 380/23 |
| 5,430,827 A | 7/1995 | Rissanen ...................... 395/2.82 |

(Continued)

FOREIGN PATENT DOCUMENTS

DE 3412663 A1 10/1985

(Continued)

OTHER PUBLICATIONS

Mayfield, Charles, "Who Goes There?", Security Management, (Mar. 1, 1989), pp. 1-5.

(Continued)

*Primary Examiner* — Aravind Moorthy
(74) *Attorney, Agent, or Firm* — Bingham McCutchen LLP

(57) ABSTRACT

A rule based biometric user authentication method and system in a computer network environment is provided. Multiple authentication rules can exist in the computer network. For example, there may be a default system-wide rule, and a rule associated with a particular user trying to log in. There may be other rules such as one associated with a remote computer from which the user is logging in, one associated with a group to which the user belongs, or one associated with a system resource to which the user requires access such as an application program or a database of confidential information. An order of precedence among the rules is then established which is used to authenticate the user.

8 Claims, 3 Drawing Sheets

U.S. PATENT DOCUMENTS

| | | | |
|---|---|---|---|
| 5,491,796 A | 2/1996 | Wanderer et al. | 709/224 |
| 5,510,777 A | 4/1996 | Pilc et al. | |
| 5,534,855 A | 7/1996 | Shockley et al. | 340/825.3 |
| 5,581,700 A | 12/1996 | Witte | 395/188.01 |
| 5,613,012 A | 3/1997 | Hoffman et al. | 382/115 |
| 5,657,389 A | 8/1997 | Houvener | |
| 5,682,478 A | 10/1997 | Watson et al. | 395/200.12 |
| 5,719,950 A | 2/1998 | Osten et al. | 382/115 |
| 5,848,231 A | 12/1998 | Teitelbaum et al. | 395/186 |
| 5,877,483 A | 3/1999 | Bilich et al. | 235/382 |
| 5,878,337 A | 3/1999 | Joao et al. | 455/406 |
| 5,931,948 A | 8/1999 | Morisawa et al. | 713/202 |
| 5,950,195 A * | 9/1999 | Stockwell et al. | 707/4 |
| 6,016,476 A | 1/2000 | Maes et al. | 705/1 |
| 6,038,315 A | 3/2000 | Strait et al. | 380/23 |
| 6,038,664 A * | 3/2000 | Schumacher et al. | 713/2 |
| 6,058,426 A | 5/2000 | Godwin et al. | 709/229 |
| 6,067,623 A | 5/2000 | Blakley, III et al. | 713/201 |
| 6,070,141 A | 5/2000 | Houvener et al. | 705/1 |
| 6,081,893 A | 6/2000 | Grawrock et al. | 713/183 |
| 6,167,517 A | 12/2000 | Gilchrist et al. | 713/186 |
| 6,182,076 B1 | 1/2001 | Yu et al. | 707/10 |
| 6,202,157 B1 * | 3/2001 | Brownlie et al. | 726/1 |
| 6,256,737 B1 | 7/2001 | Bianco et al. | 713/186 |
| 6,266,664 B1 | 7/2001 | Russell-Falla et al. | 707/5 |
| 6,269,371 B1 | 7/2001 | Ohnishi | 707/10 |
| 6,275,825 B1 | 8/2001 | Kobayashi et al. | 707/9 |
| 6,317,544 B1 | 11/2001 | Diehl et al. | 385/115 |
| 6,400,806 B1 | 6/2002 | Uppaluru | 379/88.02 |
| 6,434,259 B1 | 8/2002 | Hamid et al. | 382/115 |
| 6,618,806 B1 | 9/2003 | Brown et al. | 713/186 |
| 6,674,537 B2 | 1/2004 | Kadowaki | 358/1.15 |
| 6,736,313 B1 | 5/2004 | Dickson | 235/380 |
| 6,748,541 B1 | 6/2004 | Margalit et al. | |
| 6,751,734 B1 | 6/2004 | Uchida | |
| 6,763,399 B2 | 7/2004 | Margalit et al. | |
| 6,928,547 B2 | 8/2005 | Brown et al. | |
| 2002/0104006 A1 | 8/2002 | Boate et al. | |
| 2002/0109578 A1 | 8/2002 | Hansen | |
| 2002/0165898 A1 | 11/2002 | Duffy et al. | |
| 2003/0163710 A1 | 8/2003 | Ortiz et al. | |
| 2004/0230809 A1 | 11/2004 | Lowensohn et al. | |

FOREIGN PATENT DOCUMENTS

| | | |
|---|---|---|
| EP | 0 745 961 A2 | 12/1996 |
| EP | 0924655 A2 | 6/1998 |
| EP | 0 426 595 A2 | 1/2002 |
| EP | 1 176 489 | 1/2002 |
| FR | 2 801 995 | 6/2001 |
| GB | 2 368 951 A | 5/2002 |
| WO | WO0000882 A2 | 1/2001 |
| WO | WO 01/11845 A2 | 2/2001 |
| WO | WO 01/48674 | 7/2001 |
| WO | WO 01/52205 A1 | 7/2001 |
| WO | WO 02/056138 A2 | 7/2002 |
| WO | WO02056154 A2 | 7/2002 |
| WO | WO 02/077819 A1 | 10/2002 |
| WO | WO 03/036576 A2 | 5/2003 |

OTHER PUBLICATIONS

Matyas, Stephen M., "Common Cryptographic Architecture Cryptographic Application Programming Interface", IBM Systems Journal, (Jun. 1, 1991), pp. 1-26.

Lynch, Paul, "Beyond RACF: Extending User Authentication Controls", Computers & Security, vol. 8, No. 10, C&K Software Ltd., Elsevier Science Publishers Ltd., United Kingdom, (1991), pp. 711-722.

Oldhoeft, Arthur E., "A Survey of Password Mechanisms", Journal of Electronic Defense, (Jan. 1, 1992), pp. 1-10.

Camillone, N. et al., "Extensible User Authentication in a Computer Operating System", IBM Technical Disclosure Bulletin, vol. 34, No. 9, (Feb. 1992), pp. 480-482.

Weiss, Kenneth, "Two-factor Authentication Method Offers Much-needed Access Control", Computer Dealer News, (Jun. 28, 1993), pp. 1-3.

Wobber, Edward et al., "Authentication in the Taos Operating System", Digital Research Center, Palo Alto, CA, (Dec. 10, 1993), pp. i-viii and 1-38.

"Guideline for the Use of Advanced Authentication Technology Alternatives", Federal Information Processing Standards Publication, FIPS Pub 190, (Sep. 28, 1994), pp. 1-59.

Johnson, Ian, "Computer Theft Creates Market for Resellers", Computer Dealer News, (Dec. 14, 1994), pp. 1-4.

Esmaili, M. et al., "Authentication Techniques", The Center for Computer Security Research, University of Wollongong, Australian Privacy Commission (1994), pp. 1-15.

"The Voice: Speech Recognition, Voice Message Integration", Searcher, (Jan. 1, 1995), pp. 1-2.

Kuhnhauser, Winfried, "A Framework to Support Multiple Security Policies", Proceedings of the 7th IEEE Canadian Security Symposium, Ottawa, Canada,, (May 1995), pp. 1-19.

Yesberg, John D. et al., "QuARC: Expressive Security Mechanisms", Information Technology Division, Defence Science and Technology Organisation, Salisbury, South Australia, (1995), pp. 34-40.

Blakley, B., Security Requirements for DCE, Open Software Foundation Request for Comments: 8.1, (Oct. 1995), pp. 1-55.

Samar, Vipin et al., Making Login Services Independent of Authentication Technologies, SunSoft, Inc. (1996) pp. 1-10.

Enterprise-wide Security: Authentication and Single Sign-On, NAC Position Paper, NAC, (Jul. 14, 1996), pp. 1-43.

Galvin, Peter, "The SeOS Security Blanket", Sun World, (Jul. 1996), pp. 1-9.

Kobielus, James, "Buyer's Guide, Gotcha!", Network World, (Sep. 9, 1996), pp. 1-6.

Zurko, Mary Ellen et al. "User-Centered Security", Proceedings of the UCLA Conference on New Security Paradigms Workshops, Lake Arrowhead, CA (Sep. 17-20, 1996), pp. 1-9.

"Key Tronic Corp. Demonstrates Affordable Finger-Image Technology for Secure Identification", Business Wire, (Nov. 18, 1996), pp. 1-2.

Yamada, Ken, "ID At Touch of a Finger", Computer Reseller News, (Dec. 2, 1996) pp. 1-3.

Wilson, Tim et al. "Security At Your Fingertips", Communications Week, CMP Media Inc., (Dec. 2, 1996), p. 1.

"VASCO Integrates internet AccessKey with Netscape Security Architecture; Provides Unprecedented Security to Netscape Server Users", Business Wire, (Dec. 10, 1996) p. 1-3.

Chuang, Shaw-Cheng et al. "A Credibility-based Model of Computer System Security", ACM New Security Paradigm Workshop, Lake Arrowhead, CA (1996) pp. 53-58.

Schell, Dr. Roger, "The Internet Rules but the Emperor Has No Clothes", 12th Annual Computer Security Applications Conference, ACSAC '96, (1996), pp. xiv-xix.

"Fingerprinting To Hit 100,000 Desktops Through Deal Next Week", Newsbytes News Network, (Jan. 9, 1997), pp. 1-2.

"Authentication: From Passwords to Retina", Network World, Published by Winn Schwartau, (Jan. 27, 1997) pp. 1-2.

O'Sullivan, ORLA, Biometrics Comes to Life, ABA (Jan. 1997), pp. 1-6.

"Advanced Fingerprint Verification Security Added to Oracle Universal Server; Identix's Biometric Authentication Technology Provides Heightened Database Security", Business Wire, (Feb. 10, 1997) pp. 1-3.

"To Catch A Thief", PC Magazine, (Feb. 25, 1997) pp. 1-3.

Willems, Maarten, Layered Biometric Authentication—A Keyware Technologies White Paper, Keyware Technologies, (Sep. 4, 1997), pp. 1-11.

Triverio, Jennifer, "Forgot a Password? It's Written All Over Your Face", HomePC, CMP Media, Mar. 1, 1997 p. 1.

Leopold, George, "Digital Identification: It's Now At Our Fingertips", Electronic Engineering Times, (Mar. 24, 1997) pp. 1-4.

Messmer, Ellen, "Gradient Launches Secure Single Logon", Network World, Network World Inc. (Mar. 31, 1997), pp. 1-3.

Casatelli, Chris, Netscape Plug-in Uses Fingerprints For Access, PropheZine #40, (May 5, 1997), pp. 1-2.

Elledge, Don, "Keep Out Prying Eyes", Information Week, CMMP Media Inc., (May 5, 1997), pp. 1-9.

"HP Extends Security and User Authentication to Intranets with HP Praesidium/Security Service 1.5", Business Wire, (May 27, 1997) pp. 1-3.

Clark, Tim, "Your Fingerprint Is Your Password", CNET News.com, (Jun. 9, 1997) pp. 1-3.

Broderick, John, Associate Editor et al., "Who Knows Who You Are?", InfoWorld, (Jun. 16, 1997) pp. 1-27.

Talley, Brooks, "Test Center Comparison: Network Authentication", InfoWorld, (Jun. 16, 1997) pp. 1-35.

Aventail Corporation, Managing Corporate Access to the Internet—An Aventail Corporation White Paper, (Jun. 20, 1997) pp. 1-10.

Smead, Frank, "Know the Difference Between Recognition and Verification", Speech Technology Magazine, Reference not provided (Jun./Jul. 1997).

"New Speaker Verification API is Announced", Speech Technology Magazine, Reference not provided (Jun./Jul. 1997).

"Forget Your Password", PC Magazine Online, (Jul. 25, 1997), pp. 1-3.

Seamons, Kent E. et al., "Internet Credential Acceptance Policies", Proceedings of the 2nd International Workation of Logic Programming Tools for Internet Applications, (Jul. 1997), pp. 1-15.

Violino, Bob, "Body Language (Biometrics used for Security Purposes)", Information Week, CMP Media Inc., (Aug. 18, 1997), pp. 1-7.

Greiner, Lynn, "BioMouse 'Clever Little Gadget' That Works", Computing Canada, (Oct. 14, 1997) pp. 1-3.

"Learnout & Hauspie, Developers Show New Offerings at Technology Day", Speech Technology Magazine, Reference not provided (Oct./Nov. 1997).

Beck, Steve, A Framework for Information Security in the Enterprise, Entegrity Solutions Corporation (1997), pp. cover, i-ii, and 1-16.

Defender Secure Authentication Solution Brochure, AXENT Technologies, Inc. (1997) pp. 1-5.

Phillips, Ken, "Touching the Security Bases", PC Week Online, (Feb. 4, 1998), pp. 1-4.

McCormick, John, BioMouse Fingerprint ID System Digit-izes PC Access, Post-Newsweek Media, Inc. (Apr. 20, 1998), pp. 1-3.

Atick, Dr. Joseph J., Ceo, Visionics Corp., Testimony: "Computerized Facial Recognition: A Technology with Broad Rannge of Real-World Applications Hearing on Biometrics and the Future of Money", Presented Before The U. S. House of Representatives Committee on Banking and Financial Services (May 20, 1998), pp. 1-5.

Boll, Dr. Steven F., Director of Licensed Products, ITT Defense & Electronics Aerospace Communications Division, Testimony, Presented Before The Subcommittee on Domestic and International Monetary Policy Committee on Banking and Financial Services, of The U.S. House of Representatives Committee on Banking and Financial Services (May 20, 1998), pp. 1-6.

Cohen, Stephanie, "Product of the Month: A Look at Layered Biometrics", Bank Technology News, Jul. 1, 1998, pp. 1-3.

Phillips, Ken, Finger Scans: Touch and Go—Compaq's FIT has the Price; NEC's TouchPass has the Polish, PC Week Labs, ZD Net, ZD Inc., (Sep. 6, 1998), pp. 1-4.

Brock, Terry, "Tools to Feel You, See You and Hear You Better", Technology Tools, (Oct. 23, 1998) pp. 1-3.

Cummer, Lawrence, "Unmistaken Identity: New Technologies Such as Face and Voice Biometrics Aren't Designed to Meet Existing Needs, but Future Ones", Computer Dealer News, (Nov. 2, 1998), pp. 1-3.

BioNetrix Authentication Suite, Network World, Inc., (1999) pp. 1-2.

Phillips, Ken, "In-Your-Face Security", PC Week Online, Ziff-Davis Publishing Company, (Mar. 26, 1997), pp. 1-6.

Phillips, Ken, "Face Recognition Gears Up", PC Week Online, (Oct. 29, 1997), pp. 1-5.

Sharick, Paula, "Windows NT Authentication", Microsoft Support Website Article, (Jan. 1997) pp. 1-4.

Slifka, Robert, "How to Edit NT 4.0-System Policies", Windows IT Pro, (Feb. 1997), pp. 1-4.

User Authentication with Windows NT, Microsoft Support Website Article, Microsoft Corporation, (Aug. 8, 2001), pp. 1-3.

"Windows NT Server 4.0 Features", Microsoft Product Information/Features, Microsoft Corporation, (Jun. 20, 2001), pp. 1-10.

"Identix, Oracle Agree to Market Integrated Database Security Software System with Fingerprint Verification", Business Wire, (May 2, 1995), pp. 1-2.

Keyware Technologies, VoiceGuardian S2 Security Server Product Information, (1997) pp. 1-5.

Arar, Yardena, "Let Your Smile Be Your Security", PC World, Jun. 2, 1997, p. 1.

"Visionics Provides a Sneak Peek at FaceIt PC 3.0 at Comdex Spring 97 in Atlanta", Visionics Press Release, Visionics Corporation (Jun. 2, 1996), pp. 1-3.

"Visionics Introduces New Category of Software with FaceIt PC Face Recognition Security Suite", PR Newswire, Visionics Corporation, (Aug. 25, 1997), pp. 1-3.

Miros, TrueFace Cyberwatch, Miros Website, Miros, Inc., (Jan. 15, 1997), pp. 1-2.

Byrne, Jason, "Visions Corp Changes the Face of the PC Security", Government Computer News, vol. 16, No. 33, (Nov. 24, 1997), pp. 1-4.

FaceIt PC Access 2.0 Product Information.

Phillips, Ken, "Watchdog for Windows NT", PC Week Online, Ziff-Davis, Inc., (Aug. 6, 1997) pp. 1-5.

"Keyware Will Demonstrate the First Security System to Combine Both voice and Image Verification at COMDEX", PR Newswire, Keyware Technologies, Inc., (Nov. 12, 1996) pp. 1-2.

"Keyware Demonstrates Voice Verification Solution Providing Enhanced Security for Financial Markets", PR Newswire, Keyware Technologies, Inc., (Mar. 11, 1997), pp. 1-2.

"Keyware Technology is a Leader in the Development and Integration of Advanced Authentication Software for Security and Online Markets Applications", Keyware Technologies Website, Keyware Technologies, Inc., (Jun. 1997), pp. 1-2.

"NRI Demonstrates Low-cost, Easy-to-Integrate Biometric Personal Identification at Cardtech/Securtech '96", PR Newswire, The National Registry Inc., (May 9, 1996) pp. 1-4.

"NRI Demonstrate Economical Finger-Imaging Technology for Network Security at Networld and Interop '96", PR Newswire, The National Registry Inc. (Aug. 22, 1996), pp. 1-2.

"NRI Demonstrates Biometric Secure Authentication for Intranets/The Global Internet at ComNet '97", PR Newswire, The National Registry Inc., (Feb. 3, 1997), pp. 1-2.

"The National Registry Inc. Ships new generation of Finger Imaging ID Systems to a Growing List of Customers", PR Newswire, The National Registry Inc., (Mar. 24, 1997), pp. 1-4.

The National Registry Inc. Introduces Finger-Image Authentication for Laptops, PR Newswire, The National Registry Inc., (Apr. 7, 1997), pp. 1-3.

Phillips, Ken, "SAF Puts NT Log-ins at Your Fingertips, for PC Week Labs", PC Week, Ziff-Davis, Inc., (Jun. 1, 1997), pp. 1-2.

"National Registry Inc. Teams with Computer Associates to Bring Finger-Imaging Solutions to the Network, Replace Passwords", PR Newswire, The National Registry Inc., (Jul. 14, 1997), pp. 1-2.

"NRI Introduces Finger-Image-Based User Authentication Solution for Microsoft's Internet Information Server", PR Newswire, The National Registry Inc., (Nov. 13, 1997), pp. 1-3.

"The National Registry Inc. to License Biometric Authentication Software to Who? Vision Systems", PR Newswire, The National Registry Inc., (Jan. 30, 1998), pp. 1-2.

NRI Announces Availability of its Multi-Biometric Product Suite, PR Newswire, The National Registry Inc., (Apr. 2, 1998), pp. 1-5.

NRI to Offer Speaker Verification Technology from ITT and Facial Recognition Technology from Visionics as Part of its New Suite of Multi-Biometric Network Security Products, Visionics Press Release, The National Registry Inc., (Apr. 7, 1998), pp. 1-2.

Duksta, John, "Buyer's Guide: We Know Who You Are", Network World, Network World Inc. (Aug. 24, 1998), pp. 1-8.

Boozer, Cimarron, "Remote Access Security White Paper", Funk Software, Inc. (1996-1997), pp. 1-16.

Aboba, Bernard et al., "Extensible Authentication Protocol Support in Radius", Radius Working Group, RFC 2058, (May 22, 1997) (draft Jan. 17, 1997), pp. 1-8.

Kearns, Dave, "Radius on the Radar Screen", Network World, Network World Inc., (May 26, 1997), pp. 1-2.

Hall, Eric, "Steel-Belted Radius 1.3 Offers Strong, Flexible Remote Access", EHS Company Product Review, InfoWorld Publishing Company, vol. 19, Issue 42, (Oct. 20, 1997), pp. 1-5.

"Funk Software Announces First Radius Server with VPN/Tunneling Support and Enhanced Proxy Radius Capabilities", PR Newswire, Funk Software, Inc., (Dec. 15, 1997), pp. 1-2.

"Evaluation of FaceIt PC", Undated, pp. 1-2.

"Keyware Demonstrates Voice Verification Solution Providing Enhanced Security Over the Internet/Intranet or LAN", Keyware Technologies, Keyware Technologies Inc., (Apr. 15-17, 1997), pp. 1-2.

"Keyware Technologies Celebrates Its Birthday with a Genuine World First", Keyware Technologies N.V., (Jun. 24, 1997), p. 1.

"Diebold, Keyware Technologies, and Visionics Debut World's First Interactive layered Biometric ATM", Press Release, (Dec. 1, 1997), pp. 1-3.

Keyware Products—Accurate Personal Identification through Integrated Voice and Image Verification, Keyware Technologies USA, (1997), pp. 1-3.

Cummings, Elaine M., Ed., "The State of the Art, New Products, and Staying Ahead of the Curve", CIO Magazine, (Feb. 15, 1997), pp. 1-15.

"Miros Partners with Sun Microsystems Federal to Bring Face Recognition to Criminal Justice Applications", Press Release, Sun Microsystems, Inc. (Oct. 19, 1995), pp. 1-10.

Talley, Brooks, "CyberWatch", InfoWorld, Miros Inc., (Jun. 16, 1997), pp. 1-2.

TrueFace Network, Face and Finger Recognition for Securing Your Computer Network, (no date) pp. 1-2.

Moore, Mark, "Fingerprints ID Remote Users", PC Week, Ziff Davis Inc., (Apr. 6, 1997), pp. 1-2.

"Biometrics in Human Services", User Group, vol. 1, Issue 4, (May 1997), pp. 1-18.

"Face Up to Network Security!", Miros Press Release, Miros, Inc., (Mar. 1999)), pp. 1-3.

"Security Systems for PCs under OS/2 Warp 4", Utimaco, (Feb. 1997), pp. 1-2.

"Additional security for Windows NT environments with encryption and extended access control", Utimaco, (Feb. 1997), pp. 1-2.

NeTegrity SiteMinder: Key Benefits, Product Information, Netegrity, Inc., (Aug. 2, 1999), pp. 1-5.

"SiteMinder Product/Technology Backgrounder", Netegrity , Inc., (Feb. 1997), pp. 1-3.

"SiteMinder™ Authentication Server for Sindows NT", Netegrity, Inc., (Feb. 1997), pp. 1-3.

"SiteMinder Frequently Asked Questions", Netegrity, Inc. (Feb. 1998), pp. 1-8.

"NeTegrity Unveils Industry's First Enterprise-Wide Integrated Network Security Management System", Press Release, Netegrity, Inc., (Feb. 1997), pp. 1-3.

"Managing Windows NT Server Domains", Windows NT Server Product Documenation, Microsoft, (no date), pp. 1-5.

Daily, Sean, "Further Explorations of the NT System Policy Editor", Windows ITPro, Microsoft, (Apr. 1997), pp. 1-11.

Daily, Sean, "Further Explorations of the NT System Policy Editor", Windows ITPro, Microsoft, (Apr. 1997), pp. 1-5.

QVoice, Star Trek®: Deep Space Nine™ Voice Print Security Program: The Official Star Trek® Security Program Windows 95 Version, QVoice, Inc., (1995), pp. 1-27.

QVoice, "VoiceLock!", Product Brochure, QVoice, Inc., (no date), p .1.

"Training Center Multiple Biometrics", QVoice Manual, QVoice, (no date), pp. 1-2.

I/O Software NT Logon Software for Sony Puppy Manual (1997).

Oracle Advanced Networking (1996).

DigitalPersona,Inc., U.are.U Fingerprint Recognition System User Guide Version 1.0, Digital Personal, Inc., (1998), pp. cover-21 (12 pages).

Gradient Technologies, Inc. "Features & Benefits", NetCrusader Commander, Gradient Technologies, Inc. (no date), pp. 1-7.

Digital Persona, Inc. U.are.U, (Publicly demonstrated in Nov. 1997).

Windows NT 4.0 by Microsoft Corporation (1996).

The National Registry Inc., SAF/NT (Secure Authentication Facility for Windows NT) (Publicly available in 1997).

The National Registry Inc., SAF/TNG (Secure Authentication Facility for Unicenter TNG on Microsoft Windows NT) (Jul. 14, 1997).

Identix Biometric Authentication Adapter for Oracle Advanced Networking Option, (1996).

Oracle Advanced Networking Option v7, (Jan. 1997).

Visionics, FaceIt 3.0, (Jun. 2, 1997).

SmartGate VPN enables secure business communication with remote employees, partners, and customers., Making networks safe for business., V-One Corporation, (Feb. 1997), pp. 1-6.

I/O Software NT Logon Software for Sony Puppy Fingerprint Reader,(May 1997).

QVoice Star Trek® Deep Space Nine™ Voice Print 24th Century Voice Security Software (with face recognition extension), QVoice, (1994) pp. 1-2.

Keyware Technologies, Keyware S2 Security Server (including Voice Guardian Server), (Nov. 1996).

Funk Software, Radius Server v2.0 (Feb. 1997).

Miros, TrueFace Cyberwatch and TrueFace Network, (Cyberwatch: Aug. 1996; Network: Apr. 1998).

Gradient Technologies, Inc., Gradient NetCrusader, Gradient Technologies, Inc. (1996), pp. 1-2.

"Pluggable Authentication Modules, implemented in Sun Operating System", (1996).

Livingston Enterprises Remote Authentication Dial-In User Service (Radius), Livingston Enterprises, Inc., (1996), pp. 1-26.

QVoice VoiceLock! Voice Security Program, (1995).

Netegrity SiteMinder, v. 1.0 (1996).

NRIdentity Pass for Portables (Apr. 6, 1997).

Digital Equipment Corp., Taos Operating System, (1993).

HP Praesidium Security Service v.1.5, (1997).

Aventail Corp., Aventail VPN v.1.0, (1997).

American Biometrics Corp., BioMouse v.1.0, (1997).

AXENT Technologies Defender, (1997).

SafeGuard Professional/Advanced Security Utimaco Software, (Sep. 1996; Advanced Security: Feb. 1997).

Steel-Belted Radius Data Sheet, (no date) 5 pages.

Mercredi, Dwayne et al., *Biometric Authentication*, U.S. Patent Application Publication No. US-2004-0015243-A1 published Jan. 22, 2004; U.S. Appl. No. 10/398,360, filed Sep. 28, 2001.

Mercredi, Dwayne et al., *User Login Delegation*, U.S. Patent Application Publication No. US-2004-0015702-A1 published Jan. 22, 2004; U.S. Appl. No. 10/398,356, PCT filed Mar. 1, 2002.

Mercredi, Dwayne et al., *Credential promotions*, U.S. Patent Application Publication No. US-2004-0059590-A1 published Mar. 25, 2004; U.S. Appl. No. 10/398,355.

Jensen, Gregory C. et al., *Electronic Transaction Verification System*, U.S. Patent Application Publication No. US-2005-0165684-A1 published Jul. 28, 2005; U.S. Appl. No. 10/766,551, filed Jan. 28, 2004.

Anonymous, *LogonUser*, 1997, Microsoft, pp. 1-3.

Anonymous, *NRI Introduces Finger-Image-Enabled User Authentication for Windows NT Operating System*, NRI Product Write-Up, Nov. 1996 (3 pages).

Anonymous, *Microsoft Windows NT Resource Kit*, 1985-1993, Microsoft Press, 34-49.

Gibbs, Mark, *VINES 5.5 receives long-awaited recognition for network security*, 1993, Network World, pp. 22 and 25.

Backman, Dan, *Guarding the flank with Radius & Tacas+*, Feb. 1998, Network Computing, pp. 1-4.

Sullivan, Thomas, *Open enterprise networks demand the security enhancements in Windows 2000*, May 2000, Ent, p. 1.

Anderson et al, *NOSes enhance Internet accessibility*, May 2000, Network Computing, pp. 1-15.

Doherty, Sean, *Iridian Technologies' Private ID 2.0 let users' eyes secure their access*, Dec. 2001, Network Computing, pp. 1-3.

Fratto, Mike, *PremierAccess heads a pedestrian pack*, Sep. 2002, Network Computing, pp. 1-8.

Anonymous, *Entrust Technologies Teams with Schlumberger and American Biometric Company to Provide Enhanced Security for Today's Mobile Workforce*, Dec. 1998.

Anonymous, *Biometric Identification Inc. and I/O Software Inc. Collaborate to Integrate Fingerprint Verification Technology*, Dec. 1998.

Newton, Harry, *Newton's Telecom Dictionary*, 2002, CMP Books, 18th Updated and Expanded Edition, p. 57.

*Microsoft Computer Dictionary*, 2002, Microsoft Press, Fifth Edition, p. 427.

R. Gallery and T.I.P. Trew, *An Architecture for Face Classification*, 1992, pp. 1-5.

Cole, George, *Biometrics and its benefits*, Oct. 1996, Financial Times Information Limited, pp. 1-4.

Komando, Kim, *PC Security Now Just a Fingerprint Away*, Aug. 1998, Denver Post, pp. 1-2.

Anonymous, *Identicator Unveils Suite of Fingerprint Identification Products for the PC*, Nov. 1998, Business Wire, pp. 1-3.

Batachia, Ion Leon, et al., *Interface between vendors and customers that uses Intelligent Agents*, U.S. Patent Application Publication No. US-2002-0116349-A1 published Aug. 24, 2002; U.S. Appl. No. 09/865,111, filed May 24, 2001.

Armington, John Phillip et al., *Robust Multi-Factor Authentication for Secure Application Environments*, U.S. Patent Application Publication No. US-2003-0163739-A1, published Aug. 28, 2003; U.S. Appl. No. 10/086,123, filed Feb. 28, 2002.

Rolfe, Andrew R., *Digital Certificate System Incorporating Voice Biometric Processing*, U.S. Patent Application Publication No. US-2004-0010698-A1, published Jan. 15, 2004; U.S. Appl. No. 10/488,253, filed May 29, 2003.

Laura Guevin, *Striking While The Iron Is Hot*, Technology Marketing Corporation (Apr. 29, 2003); downloaded Jul. 7, 2004 from www.biometritech.com/features/notebook042903.htm, 3 pages.

Berlind, David, "Is that a biometric device in your pocket?", StrikeForce Technologies, Inc. Press Release of May 23, 2003; www.sftnj.com/pressreleases2.asp from Yahoo! Search of Jun. 9, 2004, 3 pages.

QT Worldtel Inc., *C.O.B.A.S Centralized Out-Of-Band Authentication System: Authentication Security for the 21st Century*, Southeast Europe Cybersecurity Conference, Sophia, Bulgaria, Sep. 8-9, 2003, 14 pages.

Krebsbach, Karen, "Security: Firms Flirt with Out-of-band Authentication; Banks Weigh Whether this Cumbersome Technology is Worth the Bother for Consumers, Particularly for On-line Banking", *Bank Technology News*, Jun. 1, 2004, 5 pages.

Samar, V. et al., *Unified Login with Pluggable Authentication Modules (PAM)*, Open Software Foundation Request for Comments: 86.0, rfc86_0, (Oct. 1995), pp. 1-30.

The Open Group, *Preliminary Specification, "X/Open Single Sing-On Service (XSSO) Pluggable Authentication Modules"*, ISBN: 1-85912-144-6, Document No. P702, (Jun. 1997), pp. Cover-126.

* cited by examiner

SYSTEM AND METHOD FOR AUTHENTICATING USERS IN A COMPUTER NETWORK

RELATED APPLICATIONS

This application is a continuation of application Ser. No. 10/614,353, filed Jul. 7, 2003 now U.S. Pat. No. 6,928,547, which is a continuation application of Ser. No. 09/347,779, filed Jul. 6, 1999 (now U.S. Pat. No. 6,618,806), which is related to and claims priority from Provisional Application No. 60/091,824, filed Jul. 6, 1998. The disclosures of said applications are incorporated herein by reference.

This application is also related to patent application Ser. No. 09/285,028 (now abandoned), filed Apr. 1, 1999, which claims priority from Provisional Application Ser. No. 60/080,319, filed Apr. 1, 1998, both of which are incorporated herein by reference.

FIELD OF THE INVENTION

The present invention relates to security systems and methods for controlling access to computers.

BACKGROUND INFORMATION

The WINDOWS NT operating system (or "WINDOWS NT") from Microsoft Corporation of Redmond, Wash. provides a set of windowed utilities that allows easy setup and administration of a security system. The WINDOWS NT operating system itself is secure and makes its security system available to all applications through a standard Win32 security API.

An important aspect of the WINDOWS NT security system is that it is usercentric. Each line of code that attempts to access a secure object (file, printer, pipe, service, etc.) must be associated with a particular user. A user must identify himself to WINDOWS NT using a user ID and a password, via a log-on function. Each security check is made against the user's identification.

As a result, it is not possible, for example, to write code that prevents an application (e.g., Microsoft EXCEL) that is running under WINDOWS NT from accessing an object. For instance, an object can be secured against access from user Joe running EXCEL, but if user Carla is allowed to access the object, she can do so using EXCEL or any other application. All Carla has to do is identify herself to WINDOWS NT using her password.

Thus the entire validity of the WINDOWS NT security system is based on accurate identification of the user. WINDOWS NT user authentication is based on user IDs and passwords. Once a password is compromised, a general collapse of the security system can occur. There is therefore a need for a capability that adds a second factor to password-based authentication mechanisms such as that of WINDOWS NT. Such a capability should also ensure robustness while improving end-user convenience.

Not only do passwords present a security risk, they are also costly to administer. To provide an acceptable level of security, it is not uncommon to require changing corporate users' passwords every 30 to 60 days. This is not only an annoyance to the user, it is a major resource drain on system administrators. Surveys have shown that over 50% of the calls received by internal corporate hotlines are password related. Adding to this the lost productivity of professional office workers trying to figure out what their correct current password is, or requesting to be reinstated on the network, leads to an estimated annual cost of maintaining passwords of as high as $300 per user.

Saflink Corporation, with funding from the U.S. Department of Defense, has developed a Human Authentication application program interface (API), or HA-API, which allows applications to work with multiple biometric technologies presently available today and to integrate with new technologies in the future without requiring changes to the applications. The HA-API specification provides a set of standard program names and functions that enable various biometric technologies to be implemented easily into application programs for network user identification and authentication. It is foreseen that HA-API will be used both by application/product developers who wish to integrate biometric technology into their applications as well as by biometric vendors who wish to adapt their technologies for use within open system application environments.

FIG. 1 is a block diagram illustrating the architecture of HA-API. HA-API provides two interfaces. The first interface is an application API 101 consisting of functions 103 to determine which biometric technology (finger image, voice, facial image, etc.) is available to the application 10 and a set of functions 105 to authenticate a user's identity via any of the available technologies. The HA-API authentication functions 105 hide the unique characteristic of each biometric from the application 10. The second interface is a Biometric Service Provider (BSP) Interface 111 which provides a common interface for biometric technology providers to "plug-in" their unique modules 150. BSP modules 150 contain the capture, extraction (converting biometric features into a digital representation called a Biometric Identifier Record), and matching capabilities of a biometric vendor.

The full text of the Human Authentication API has been published by the Biometric Consortium (available at http://www.biometrics.org).

SUMMARY OF THE INVENTION

The present invention provides a rule based biometric user authentication method and system in a computer network environment. Multiple authentication rules can exist in the computer network. For example, there may be a default system-wide rule, and a rule associated with a particular user trying to log in. There may be other rules such as one associated with a remote computer from which the user is logging in, one associated with a group to which the user belongs, or one associated with a system resource to which the user requires access such as an application program or a database of confidential information. An order of precedence among the rules are then established which is used to authenticate the user.

In operation, a user identification such as a password is received. If an authentication rule associated with the user exists, the system according to the present invention authenticates the user with a captured biometric information and a previously stored biometric information according to the authentication rule associated with the user. If not, the system authenticates the user with the captured biometric information and the previously stored biometric information according to a system default rule. In that embodiment, the user rule has a higher precedence than the system default rule.

DETAILED DESCRIPTION

Figure 1:
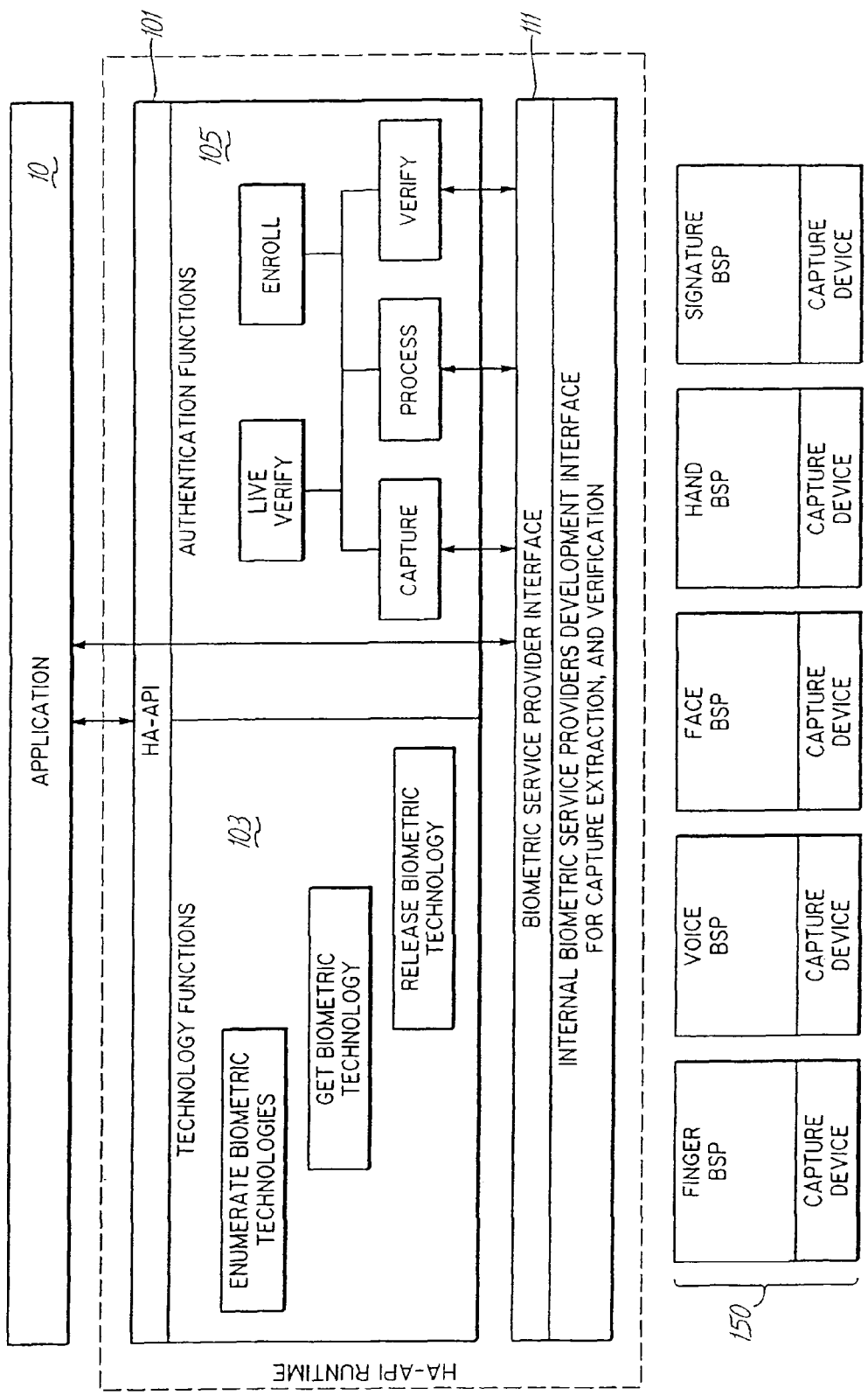
FIG. 1 is a block diagram of the architecture of the Human Authentication API (HA-API).
Figure 2:
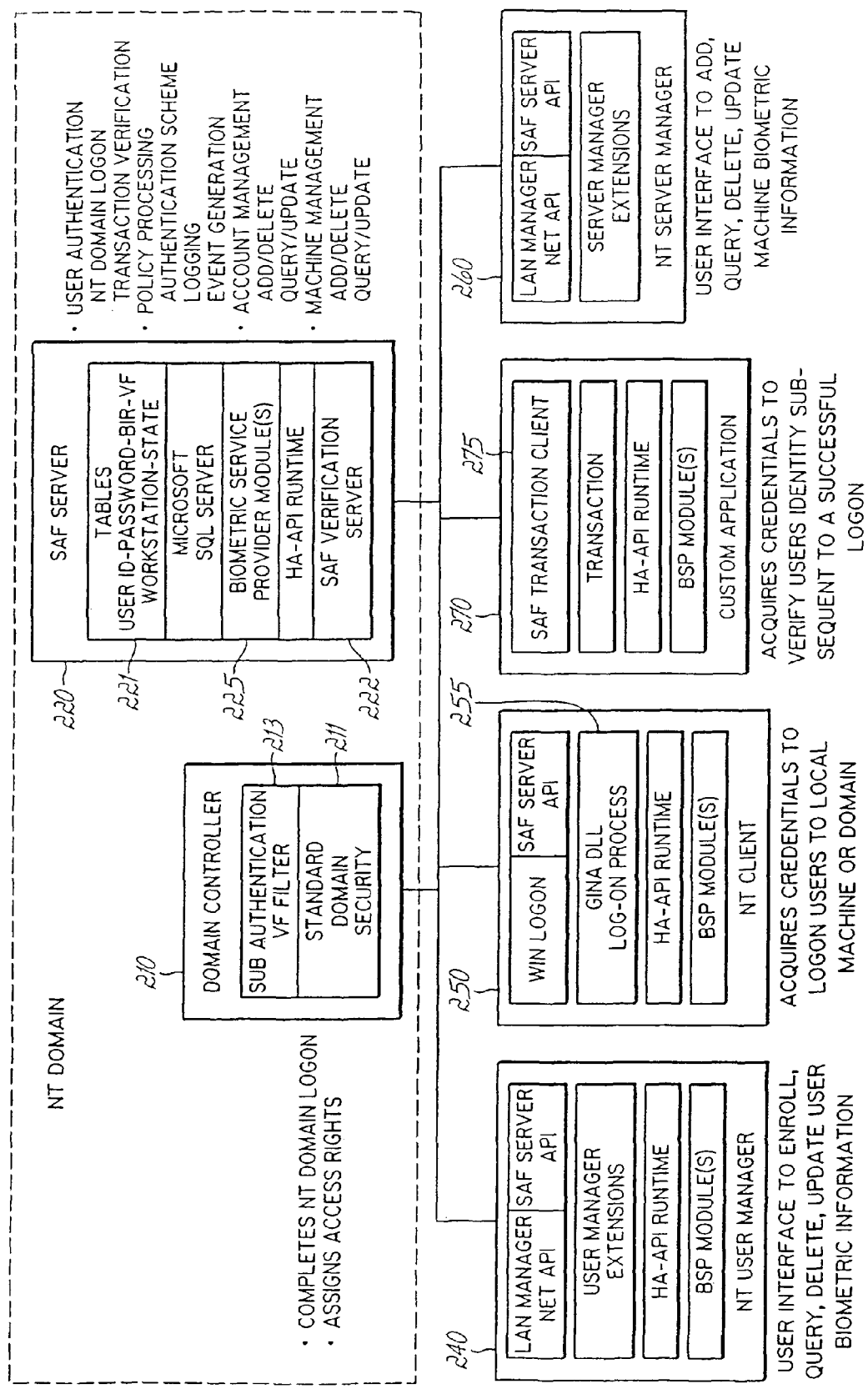
FIG. 2 is a block diagram of an exemplary system in accordance with the present invention.

FIG. 2 is a block diagram showing the various components in an exemplary system in accordance with the present invention. The exemplary embodiment described operates in conjunction with the WINDOWS NT operating system. Although a WINDOWS NT-based embodiment is described, the system of the present invention is applicable to a wide variety of operating systems.

An exemplary embodiment of a system in accordance with the present invention includes a plurality of software modules: a Graphical Identification and Authentication (GINA) DLL 255; SAF Server 220; SAF/NT VF Sub-authentication filter 213; extensions to WINDOWS NT User Manager 240 and Server Manager 260; and SAF Transaction Client 275. In addition, a modified WINDOWS 95/98 Network Provider may be included for WINDOWS 95/98 installations. These modules can be installed as an add-on or over-pack to the basic WINDOWS NT operating system. Once Microsoft's standard products, such as WINDOWS NT Client 250, WINDOWS NT Server, and SQL Server have been installed on a computer system, the aforementioned modules of the system of the present invention can be installed.

The GINA DLL 255 is the portion of the WINDOWS NT client 250 that challenges a user for their userID, domain, and password. As part of SAF/NT, the GINA DLL 255 is modified to include biometric identification in accordance with the present invention. The modified GINA DLL 255 preferably can be invoked with the same key sequence (e.g., CTRL+ALT+DEL) used to invoke the standard GINA DLL.

The modified GINA DLL 255 communicates with the SAF Server 220 (described below) to determine the state of the workstation, to query the registration status of a user, and to verify the user's BIR. The GINA DLL 255 also communicates with the NT security subsystem 211 to log a user onto a workstation or domain controller 210.

The modified GINA DLL 255 may also preferably provide a secure screen saver capability that locks a workstation's keyboard and hides information displayed on the video monitor during a user's absence from the workstation. Upon return, only the user's biometric is required to unlock a biometrically enabled workstation. If a password-only user is logged on to a biometrically enabled workstation, then the user's password will unlock the workstation. The screen saver can be invoked manually through a key sequence or via a configurable time-out value.

The SAF/NT Windows 95/98 Network Provider delivers the same functionality as the GINA DLL for domain log-ons from a WINDOWS 95/98 workstation. Since WINDOWS 95/98 does not support the same level of security for the client workstation as does WINDOWS NT, biometric authentication is supported for domain log-ons only.

The SAF Server 220 performs several functions. First, the SAF Server 220 responds to requests from the GINA DLL 255 to query the registration status of a user with a command to capture the appropriate biometric or password. A user can have multiple biometrics registered (fingerprint, voice print, facial shape, etc.), with one biometric designated as primary. The primary biometric for a user is the biometric the user would normally be challenged for if the workstation supports the capture device. If the workstation does not support the user's primary biometric (e.g., fingerprint) but does support a secondary biometric for which the user is registered (e.g., voice), the SAF Server 220 will command the GINA DLL 255 to capture the secondary biometric. As such, the SAF Server 220 controls the biometric capture procedure in accordance with the user's biometric status as well the biometric capabilities of the workstation by which the user seeks access.

Second, the SAF Server 220 maintains a database 221 of Biometric Identifier Records (BIRs) for a plurality of registered users. Each BIR contains biometric information for a user, preferably in accordance with the HA-API specification. Each registered BIR is associated in the database 221 with the corresponding user's userID and password. The SAF Server 220 verifies the BIR of a user attempting to log-on. Biometric matching is performed at the SAF Server 220. This provides the strongest identification and authentication possible since the server is typically physically secured. Since it is not practical in most networks to physically secure client workstations, other biometric log-in solutions that perform the biometric match at the remote client workstations are more vulnerable to a determined hacker attempting to circumvent the authentication process.

The SAF Server 220 supports multiple biometric types (e.g. fingerprint, voice print, facial shape, etc.) and multiple vendor technologies for each biometric type. A system administrator can set the primary biometric type and technology for each user. At authentication time, the primary biometric type and technology are compared with the client workstation's capabilities. If the workstation does not have the necessary resources to capture the primary biometric, the user can be optionally challenged for a password.

The SAF Server 220 also maintains the state of all workstations in the domain, logs failed verification requests in the NT security log and logs system administrator access in the NT security log.

In the exemplary embodiment, communications between client workstations and the SAF Server 220 is via Remote Procedure Calls (RPC) and is encrypted. A different encryption key is used for each session between a client and the server. If a strong encryption version of the WINDOWS NT operating system is used, 128-bit keys are generated.

Multiple SAF Servers can be configured using the replication services of SQL Server and Microsoft's Cluster Server (Wolfpack). The SAF Server(s) can be located on a domain controller, back-up domain controller, or on separate physical servers. This provides for scalability and resiliency of the SAF Server in large networks.

The SAF Server facilitates centralized management of user identification and authentication and also makes it easy to integrate additional biometric identification application modules in the future. All user information can be stored in a database, such as a Microsoft SQL Server database, using encryption, such as RSA's RC4 encryption.

Extensions to WINDOWS NT's standard User Manager and Server Manager provide enrollment and maintenance functions used by a systems administrator to register userIDs, passwords, BIRs, and workstation information into the SAF Server's database. The extensions also allow a systems administrator to delete a user, query a user's status, delete a workstation entry, and change the state of a workstation. The extended User Manager 240 and Server Manager 260 can communicate with the SAF Server 220 using NT RPC. All data is encrypted.

Figure 3:
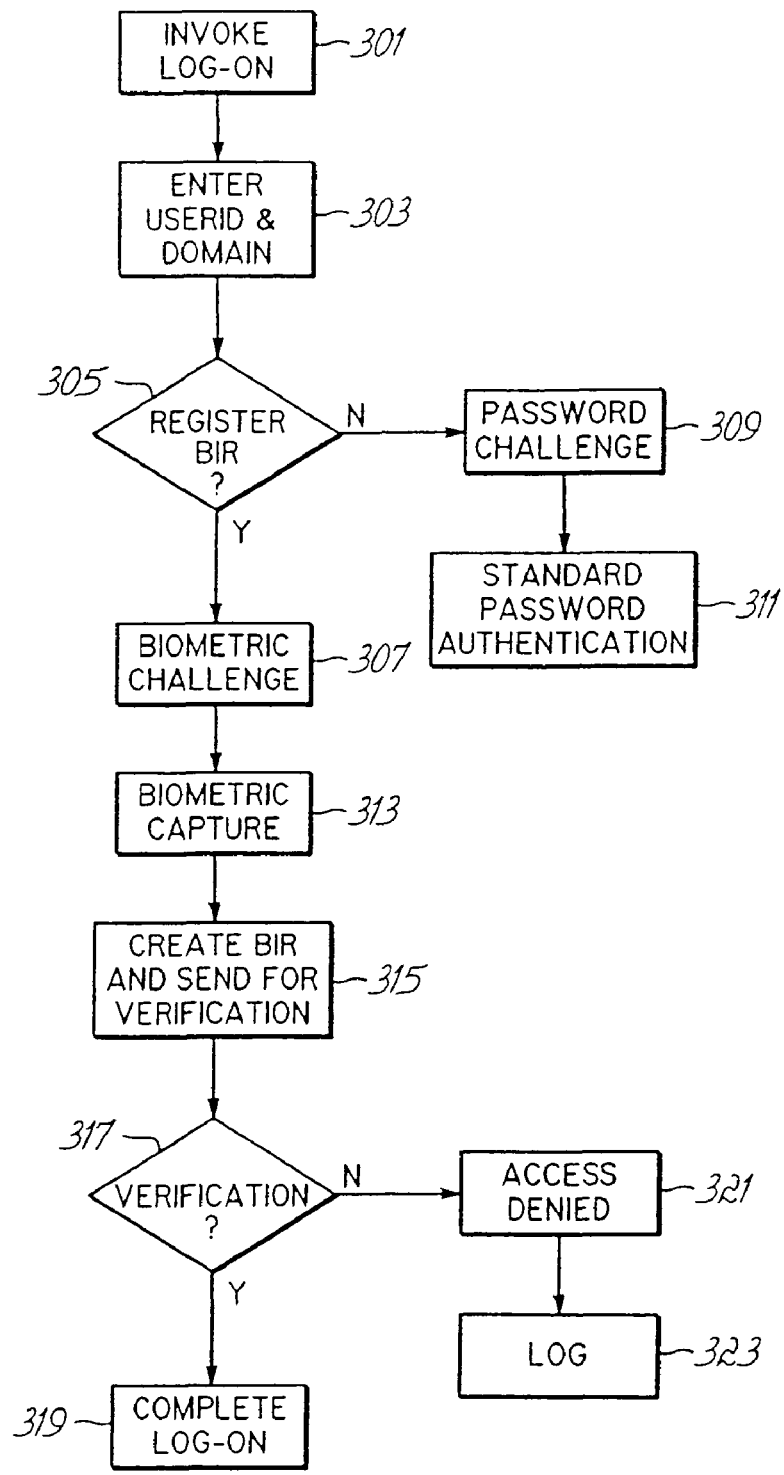
FIG. 3 is a flow chart depicting an exemplary log-on process with the system of the present invention.

FIG. 3 shows a flow chart of an exemplary log-on process in accordance with the present invention.

At step 301, a user invokes the log-on process, such as by pressing the standard WINDOWS NT key sequence Ctrl/Alt/Del. At step 303, the user enters his userID and domain. If it is determined at step 305 that the user's BIR is registered, the user is challenged at step 307 for his biometric features (e.g., finger image, voice, facial image, etc.) If it is determined at step 305 that there is no registered BIR for the user, the user is challenged at step 309 for his password. Log-on will then occur, at 311, using standard WINDOWS NT password authentication.

At step 307, the user is challenged to provide a biometric input for capture by the system. This procedure can be carried out with the assistance of a biometric capture wizard displayed on the computer. Once challenged for a biometric, the user follows the instructions of the biometric capture wizard. Each type of biometric requires the user to follow a different set of instructions such as placing a finger on a scanner for finger image, speaking a phrase into a microphone for voice recognition, or facing a camera for facial authentication. The biometric is captured at step 313.

At step 315, the modified GINA DLL creates a BIR from the captured biometric and sends the BIR with the userID to the SAF Server for verification. The SAF/NT Verification Server 222 retrieves the user's record and compares the BIR submitted by the user to the BIR stored in the database 221. The comparison of BIRs is carried out using a HA-API compliant Biometric Service Provider (BSP) module 225 for the given biometric. Such modules are available, for example, from Visionics (for face image), ITT (voice) and Cogent (fingerprint). At step 317, the SAF/NT Verification Server makes a yes/no decision and returns this decision to the user's workstation.

If the verification server 222 verifies that the user is authorized to log on, the server will retrieve the user's password from the database 221 and send the user's password back to the workstation where the log-on will be completed, at step 319, via the GINA DLL 255. The completion of the log-on procedure is transparent to the user. If the verification server decides that the user is not authorized, at step 321 the user will be denied access and an "access denied" message will be displayed on the screen. Additionally, at step 323, the failed verification will be logged, such as in the WINDOWS NT security log.

A SAF/NT Validity Flag Sub-authentication filter 213 is optionally installed on the domain controller 210. The filter 213 communicates with the SAF Server 220 to check the status of a user's validity flag whenever an authorization request for that user is received by the domain controller 210. Validity flags are used to determine whether users attempting to log-on were recently authenticated by the SAF Server 220 within some preselected time interval (e.g., 0.1-2 seconds) prior to being authenticated by the standard password security system 211. If a user attempting to log-on was not recently authenticated by the SAF Server 220, that indicates that the user wrongfully by-passed the SAF/NT biometric authentication system. The combination of the workstation state and the validity flag prevents a person from disabling the biometric capture hardware on a workstation in an attempt to bypass the biometric authentication process and use a password only. The validity flag contains a time stamp.

A SAF Transaction Client 275 allows a custom application 270 to verify a user's identity via the SAF Server 220, subsequent to a successful logon. The identification can be of the currently logged-on user or another user who is enrolled in the SAF database. A supervisory override on a transaction is an example of a situation in which another user would be identified.

At a time when "hacker contests" result in mainframe security breaches at the Pentagon and other government agencies, the need for a comprehensive data security plan has never been greater. Managing information security is now a major enterprise challenge, as applications evolve to run over a mix of public and private networks. To be effective, information security must adapt to business needs, enable business processes, and become an integral component of business systems.

As the world shifts from an industrial economy to one based on information, key new technologies led by the Internet are enabling a business revolution where people and businesses are interacting in new and exciting ways. The ability to make information accessible from anywhere in the world that has an Internet connection and a browser has been a catalyst for a whole new breed of business applications. Internet based enterprise network applications that provide a consistent view of a company and its services, enable better communication both inside the company and between the company and its partners, suppliers, and customers. They provide a strategic competitive advantage on both the top and bottom lines.

Security is a principle enabler of the information-based economy, allowing for the creation of the virtual corporation and the migration of business applications to Internet based enterprise network applications. Today, the distinction between the "good secure" internal network and the "bad insecure" external network is no longer valid. Companies must not only protect the perimeter and interior of their network, but also the data and applications used to run the business in a global information anytime, anywhere environment.

Internet-based enterprise network applications require security solutions for implementing business policies. Each organization has to establish and enforce policies covering when and how users are identified before accessing proprietary information. At Saflink Corporation, an assignee of the present application, it has developed a software called SAFsite that delivers a next-generation identification and authentication (I&A) solution which lets organizations enforce their business policies securely. In developing the SAFsite product, Saflink began by designing a base architecture for an enterprise network solution. The resulting multi-biometric I&A framework is network-centric, and features a central SAF Server that may be shared by all Web applications. This facilitates centralized management of user identification and authentication and also makes it easy to integrate additional application modules as time goes on. SAFsite is HA-API compliant (a recognized industry standard) supporting multiple biometrics, affording users maximum flexibility and choice.

SAFsite provides biometric-based identification and authentication of Web site administrators and end-users with access privileges to protected Web information. It is built on the proven SAF architecture, supporting multiple biometrics, and is integrated with the other members of the SAF family.

SAFsite delivers the most positive form of user identification and authentication. A comprehensive data security plan includes a number of elements—encryption, access control hierarchies, security policies, physical security of data servers, etc. But the cornerstone of any sound enterprise security plan is user I&A. Without uncompromising I&A, other elements of the security solution are jeopardized. And, nowhere in an enterprise network is user identity more in question than on the Internet.

SAFsite is a software development kit which allows multi-biometric based I&A to be integrated into enterprise network applications designed for the Internet built with leading rapid application development tools such as Everware Development Corporation's Tango, Allaire's Cold Fusion, NetObject's Fusion, Microsoft's Visual InterDev, HAHTSite, and NetDynamic's Enterprise Network Application Platform.

Each user whether a Web site administrator, employee, or customer attempting to access protected, proprietary information is biometrically authenticated by SAFsite prior to gaining access permission. When a user attempts to access a protected Web page, SAFsite challenges the user for their userID. For a user who belongs to a group, the userID may include a primary key that identifies the group and a secondary key that identifies the user within that group. The keys may be typed in by the user, or automatically generated by, for example, the swipe of an employee ID card through a card reader. Based on a set of enterprise security policies SAFsite then challenges the user for the appropriate biometric credentials, such as finger-image, voice print, or facial image. The user's biometric is captured, individual characteristics are extracted from the biometric, and a digital representation of the characteristics are sent to the SAF Server 220 for authentication. SAFsite supports both Microsoft's Internet Explorer and Netscape Communicator browsers.

The SAF Server 220 maintains a database 221 of all users and their biometric credentials. Biometric matching is performed at the trusted SAF Server 220. This provides the strongest identification and authentication possible since the server is typically physically secured. Since it is not practical in most networks to physically secure client workstations, other biometric log-in solutions that perform the biometric match at the remote client workstation are more vulnerable to a determined hacker attempting to circumvent the authentication process.

All user information is stored in the Microsoft SQL Server database using RSA's RC4 encryption. In its current implementation, SAFsite requires the customer to purchase one of the versions of Microsoft SQL Server (workstation or server) or the Microsoft Back Office suite. The communications between the browser's biometric ActiveX control or plug-in and the SAF Server is via Secure Sockets Layer. Communication between a Web application and the SAF Server is via Remote Procedure Calls (RPC) and is encrypted. If a strong encryption version of the Windows NT operating system is used, 128 bit keys are generated.

Scalability and resiliency of the SAF Server in large networks is provided for through the ability to configure multiple SAF Servers using SQL Server replication services and Microsoft's Cluster Server (Wolfpack). The SAF Server(s) can be located physically on a Web server or on separate physical servers.

As an overview of the SAFsite architecture, it provides a foundation for userbased, multiple biometric identity authentication for Web based enterprise network applications. It can be used as is, or extended to provide a powerful, yet flexible password replacement or augmentation mechanism.

SAFsite includes three main components: browser biometric extensions, the authentication client library, and the SAF Server. The first component, browser biometric extensions, includes a Microsoft Internet Explorer active-X control and a Navigator Communicator "plug-in" that capture an individual's user-ID and biometric information, such as finger print facial shape, or voice print. The browser biometric extensions provide biometric capture for both enrollment and authentication. They interface with a HA-API Biometric Service Provider module (see HA-API specification for details).

The first component, browser biometric extensions, communicates with the Web application via Secure Sockets Layer and all data is encrypted. The Web application also interfaces to the authentication client library. The authentication client library provides an interface for communicating to the SAF Server. All data buffering and session management between the browser extensions and the authentication client library is the responsibility of the Web application.

The third component is the SAF Server that accepts requests from multiple clients. The SAF Server communicates directly with an encrypted database that maintains user information. This information includes user name, biometric records for each user, authentication rule, and additional application specific data such as encrypted password or key for another data table. Primary and secondary keys are maintained for those users who belong to a group. This would allow for the authentication server to be extended to support 1 to few searching, based on the secondary key. That is, the biometric record of the user is compared against those of the group members. The components of the server can exist on a single machine, or can reside on multiple machines, taking advantage of distributed object architectures such as DCOM or CORBA, which would handle load balancing and referral services for the server. Communication between the client and server is via Secure RPC, using the strongest encryption available on the data being sent.

According to a preferred embodiment of the present invention, SAF Server authentication employs a rule-based, multiple biometric solution. Rule-based authentication allows for a powerful, yet extremely flexible mechanism for identifying users. It also allows for the combinations of multiple biometrics to be mixed to offer strong authentication. Rules can be as simple as logging on with a single biometric, or can be as complex as specifying multiple authentication paths, depending on time-of-day, security level, applicable biometric success, and reasonable false accept/reject levels. A hierarchy of rules precedence is also maintained.

Rule based biometric authentication is the notion of authenticating a user based on a variety of rules which specify different actions to take depending on the parameters specified by the rule. Parameters may include time of day, security level, success/failure of a specific biometric, or false accept/reject levels. Additional parameters can be specified by an application to suit particular authentication needs. Examples of a rule may be "use a fingerprint or facial biometric information for authentication during business hours", "use a combination of fingerprint and facial biometric information during non-business hours and authenticate the user only when the confidence level of the match is above 90%", or "authenticate a user using any biometric information with a confidence level of at least 95%".

Multiple rules can exist inside the entire client/server world. Therefore an order of precedence is defined. By default, a system wide rule is defined. This rule has the lowest of precedence and may be as simple as a single biometric authentication such as "use a fingerprint biometric information for authentication". If secondary keys are used in the authentication database, a primary key can have a rule associated with it. For example, for access to a joint account in an Internet banking application software, a user may have a primary key associated with the account such as the main account number and a secondary key associated with the user himself such as his own sub-account number or a Social Security number. This allows for group based rules. This group-based rule has precedence over the system default rule. A particular user (identified by a unique primary and secondary key combination) can have an associated authentication rule. This authentication rule has precedence over the group and system default rules. Additional rules to handle workstation (if available) and object can be added to extend the architecture. Their precedence would be workstation over user, object over workstation. As persons of ordinary skill in the art can appreciate, an object is anything that needs to be secured against unauthorized access. For example, an object can an application program such as an Internet banking program or any computer resource such as a storage device that stores confidential data. As an exemplary case, the following provides an order of precedence:

1. Use the rule associated with an object if available else,
2. Use the rule associated with a workstation from which a user is trying to log on if available else,
3. Use the rule associated with the user else,
4. If primary and secondary keys are used, Use the rule for a primary key (group) if available else,
5. Use the system default rule.

The third component of SAFsite, authentication client library, provides the functionality needed to create, maintain and authenticate against a secured, multiple biometric user database. This functionality includes authentication as well as typical database requests: add, delete, update and query. To support rule-based authentication, the client library also provides functions for creating and maintaining rules.

The following exemplary functions are included in the library:

Authenticate( )—The authenticate function provides a single function call verifying a users identity. The server performs authentication based upon the stored rule. Additionally, an overriding rule can be specified by the user, which would allow for object based authentication. The function is wholly responsible for prompting the user for all of the required interaction for capturing the biometrics specified in the rule. Authenticate can also return the user data if requested. This function will perform a 1 to few match if a primary and secondary key exists in the database and the authenticate function is only called with a primary key (thus enabling group searching).

Add( )—The add function inserts a user into the Authentication database. A primary key, a secondary key (if available) biometric data and user specific data can be added.

Delete( )—The delete function removes a record from the Authentication database based upon primary (and secondary if available) key.

Update( )—The update function refreshes the data found in the Authentication database for a particular primary (and secondary if available) key.

Query( )—The query function retrieves the current data for a particular primary (and secondary if available) key. The query function can be used for retrieving the authentication rule as well. Any Web application that requires biometric authentication can take advantage of the authentication client library.

The SAF Server 220 provides the actual mechanism for storing biometric data and authenticating against that data. It accepts requests from multiple clients who desire authentication. Upon receiving a request for authentication, the server performs the particular match based upon a specified biometric. The specification of this biometric is dictated by the client Authenticateo function as it processes the authentication rule. If there are any factors to be used for matching (i.e. false accept/reject rates, security level, etc), the server takes them into account before returning a TRUE/FALSE answer to the client. The SAF Server supports primary and secondary keys, and can be configured to handle either. Using secondary keys can allow for the creation of groups and can facilitate group wide authentication searches and group wide rules.

The SAF Server 220 also accepts requests for database maintenance. These requests are issued by a client and include Add, Delete, Update and Query.

In its simplest form, the SAF Server 220 is a single server containing the code responsible for authenticating, as well as database maintenance. The database also resides on this machine (See FIG. 2). Since the SAF Server supports distributed objects, the pieces of the server could lie on multiple machines, thereby distributing the workload and allowing for higher performance, scalability and load balancing. In this scheme, the database can also reside on a separate machine. There are multiple methods for accomplishing this task. First each client can have specific knowledge of the location of each piece of the server and its appropriate task. The client is responsible for routing the different requests to the appropriate servers. In distributed object architectures, like DCOM, this routing is handled for the client, requiring no additional code. Unfortunately, while distributed, this method doesn't offer much in the way of load balancing. A second approach relies upon a referral object that initially accepts all of the requests from the client. This referral object can maintain information about server load, network topology between client and servers, and statistics about past demands of a given user. Given this information, when the client connects to the referral server, it is directed to most appropriate server to accomplish the requested tasks. The SAF Server can be configured to support all of these architectures.

Depending on application requirements, the Authentication Server can be extended to include additional information. For example, this information may include workstation information (authentication rule for the workstation, workstation enabled or disabled, etc.).

The foregoing specific embodiments represent just some of the ways of practicing the present invention. Many other embodiments are possible within the spirit of the invention. For example, although many aspects of the invention were described in the Internet environment, they may be operated in any computer network environment. Accordingly, the scope of the invention is not limited to the foregoing specification, but instead is given by the appended claims along with their full range of equivalents.

What is claimed is:

1. A computer-implemented method of controlling access to a computer resource in a computer environment, comprising:

assigning by an authentication server a first order of precedence as between at least first and second authentication rules for a first set of conditions pertaining to a user desiring access the resource;

assigning by the authentication server a second order of precedence as between at least the first and second authentication rules for a second set of conditions pertaining to the user desiring access the resource;

based on the presence of the first or second set of conditions, assigning-one of the first order of precedence and second order of precedence to the first authentication rule and assigning the other of the first order of precedence and second order of precedence to the second authentication rule; and enabling the user to attempt authentication to the authentication server in accordance with at least one of the authentication rules applied in the assigned orders of precedence, and accordingly access to the resource if the conditions of at least one of the authentication rules is satisfied.

2. The method of claim 1, further comprising identifying at least the first and second set of conditions.

3. The method of claim 1, further comprising determining by which of the at least first and second authentication rules the user should be authenticated.

4. The method of claim 1, further comprising setting at least the first order of precedence as between the first and second authentication rules.

5. A computer-implemented method of controlling access to a computer resource in a computer environment, comprising:
- assigning by an authentication server a first order of precedence as between a first plurality of authentication rules for a first set of conditions pertaining to a user desiring access the resource;
- assigning by the authentication server a second order of precedence as between a second plurality of authentication rules for a second set of conditions pertaining to the user desiring access to the resource;
- based on the presence of the first or second set of conditions, assigning one of the first order of precedence and second order of precedence to the first plurality of authentication rules and assigning the other of the first order of precedence and second order of precedence to the second plurality of authentication rules; and
- enabling the user to attempt authentication to the authentication server in accordance with at least one of the pluralities of authentication rules applied in the assigned orders of precedence, and accordingly access to the resource if the conditions of at least one of the pluralities of authentication rules is satisfied.

6. The method of claim 5, wherein enabling the user to attempt access further comprises enabling the attempt wherein the first and second pluralities include different numbers of authentication rules.

7. The method of claim 5, wherein enabling the user to attempt access further comprises enabling the attempt wherein the first and second pluralities include the same number of authentication rules.

8. The method of claim 5, wherein enabling the user to attempt access further comprises enabling the attempt wherein the first and second pluralities include dissimilar authentication rules.

* * * * *